(No Model.) 3 Sheets—Sheet 2.

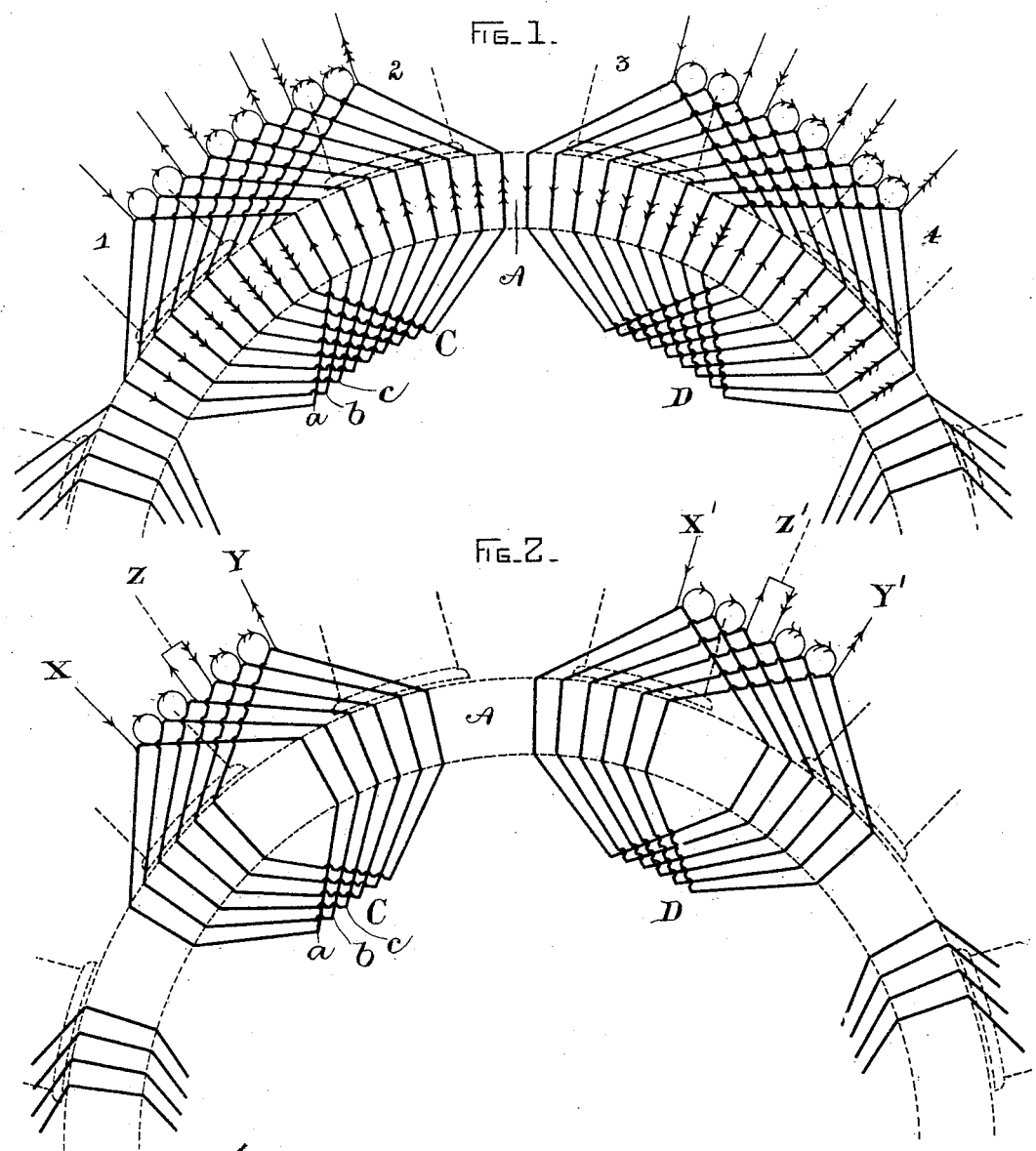

C. P. STEINMETZ.
WINDING FOR DYNAMO ELECTRIC MACHINES.

No. 533,246. Patented Jan. 29, 1895.

WITNESSES
Henry O. Westendorf.
B. B. Hull.

INVENTOR
Charles P. Steinmetz
By his Atty R. Blodgett (No Model.) 3 Sheets—Sheet 3.

C. P. STEINMETZ.
WINDING FOR DYNAMO ELECTRIC MACHINES.

No. 533,246. Patented Jan. 29, 1895.

WITNESSES
A. F. Macdonald
R. B. Hull

INVENTOR
Charles P. Steinmetz
By Geo. R. Blodgett
Atty.

UNITED STATES PATENT OFFICE.

CHARLES P. STEINMETZ, OF SCHENECTADY, NEW YORK, ASSIGNOR TO THE GENERAL ELECTRIC COMPANY, OF NEW YORK.

WINDING FOR DYNAMO-ELECTRIC MACHINES.

SPECIFICATION forming part of Letters Patent No. 533,246, dated January 29, 1895.

Application filed July 14, 1894. Serial No. 517,559. (No model.)

*To all whom it may concern:*

Be it known that I, CHARLES P. STEINMETZ, a subject of the Emperor of Germany, residing at Schenectady, county of Schenectady, and State of New York, have invented a certain new and useful Improvement in Windings for Dynamo-Electric Machines, of which the following is a specification.

My invention relates to improvements in dynamo electric machines, and more particularly to those machines in which cross or end connections over-lap at the ends of the armature or field. Such over-lapping exists in direct current, alternating and polyphase machines in which there is more than one tooth per pair of poles.

In all machines of the above character it has been usual to so construct the winding that at every point of circumference the coils over-lap one another at the end of the armature or field. This is a serious objection, as it renders the coils difficult of removal for repairs, and makes it impossible to divide the magnetic structure without removing some or all of the coils.

My invention consists in arranging the coils in separate sets or sections, whose combined effect is the same as that of the continuously over-lapping coils now used, but whose end portions or cross-connections, while over-lapping in each set, do not over-lap those of other sets. This enables each set to be removed independently of and without disturbing the others, and also enables the magnetic structure to be divided up into two or more separable parts. One advantage of this is that it enables me to make a three phase induction motor, which is eminently suitable for use as an electric railway motor, the field structure being divided, say, along a horizontal plane, in like manner to the present direct current railway motors. The advantages of such a construction are, that it permits ready inspection and repair of the motor parts, including the armature, while the machine as a whole remains in place on the truck.

Figure 3:
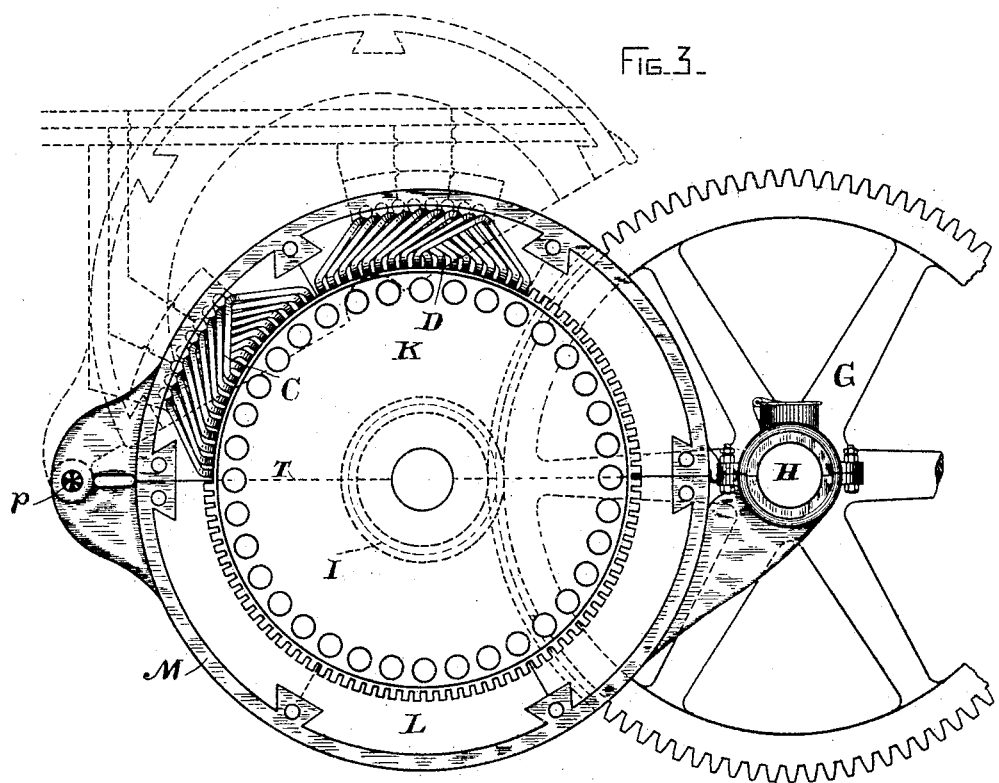
Figure 4:
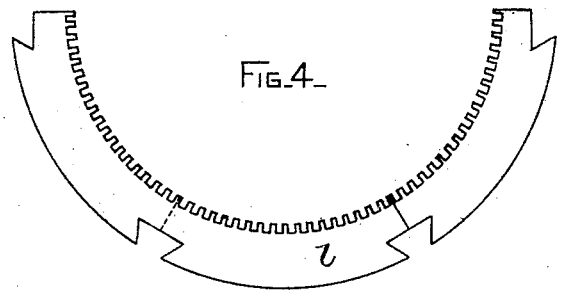
Figure 5:
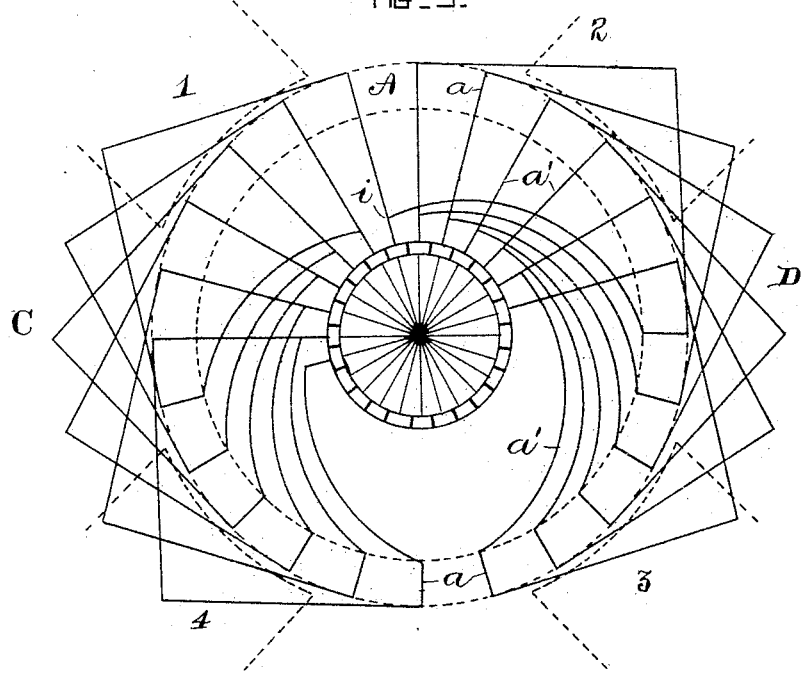
Figure 6:
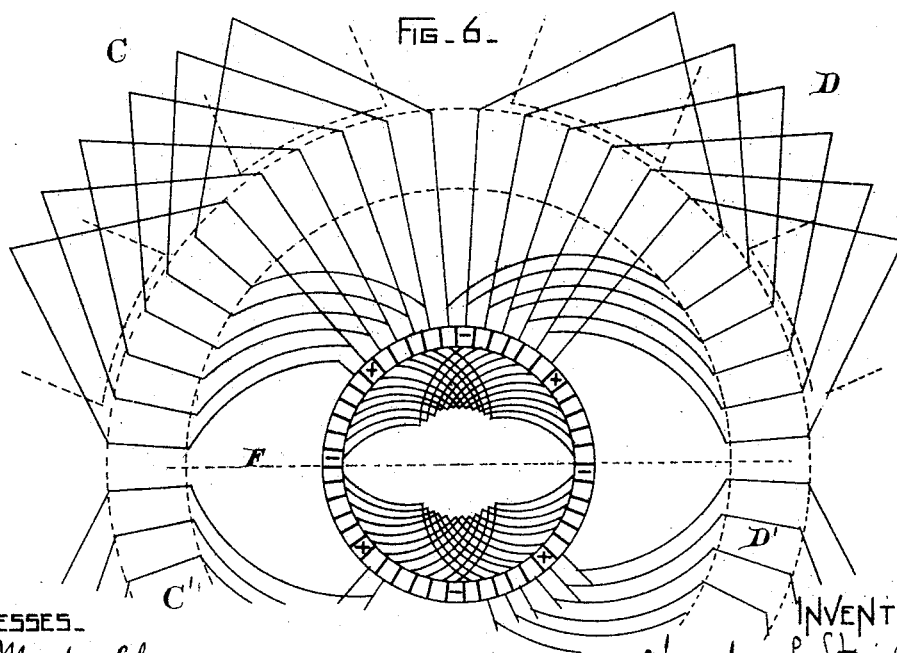

In the accompanying drawings Figure 1 is a diagrammatic representation of the armature winding of a three-phase machine, either a generator or a synchronous motor. Fig. 2 is a similar diagram, showing the winding as applied to a monocyclic machine. Fig. 3 is a side elevation of a three-phase induction railway motor, having its field winding arranged according to my invention. Fig. 4 shows the punching which may be used in constructing the field of such a motor. Figs. 5 and 6 show the application of my invention to direct current machines, respectively of four and eight poles.

Referring to Fig. 1; 1, 2, 3, 4, &c., represent field poles of a three-phase twelve pole generator, of which A may represent the armature. The radial lines drawn on the armature represent, according to usage, portions of the wire that sweep across the field, and in which the electro-motive-force is generated, while the diagonal lines at the end represent the cross or end connections. The winding consists of coils $a$, $b$, $c$, &c., and the heavy black lines representing the single coil are supposed to represent a number of turns constituting that coil, the light lines at the end, representing the connections between successive coils. It will be seen that the coils are substantially similar in size and shape, each having a breadth about equal to the pitch or distance between poles, and that they are connected around in consecutive order. It will also be seen that there are nine coils for each pair of poles, and being a three-phase machine, there are three coils for each phase per pair of poles. In polyphase machines of this character it has been usual to wind the coils in a regular succession around the complete circumference of the machine, the coils in, say a three-phase machine, being divided into three series, each series having a part recurring at regular intervals around the machine, and the three series overlapping continuously around the machine so that at no portion of the circumference was the magnetic structure free from over-lapping parts of the winding, and the whole was so bound together that it was impossible to separate the magnetic structure without disturbing the winding.

In accordance with my invention the winding is divided into separate groups C, D, &c. It will be seen that while the winding in each group over-laps at the end or cross connection, they do not over-lap, and are entirely free from, the windings of other groups. Each set or section C, D, of coils extend over a range or circumferential portion of the armature, corresponding to one pair of adjacent poles, and with this construction there would be as many sets as there are pairs of poles. It is then possible to divide the magnetic structure into as many parts as there are pairs of poles.

The machine, if a generator, may be supposed to be delivering separate three-phase currents to separate circuits, from each set of coils or the separate sets of coils may be connected together in series or parallel by appropriate connections, which may be readily separable in case it is desired to remove any one of the coils or divide the magnetic structure of the armature. If it is used as a motor similar connections would be made.

In Fig. 2, C, D, &c., represent, as before, separate groups of coils similarly disposed with reference to the successive pairs of poles. This machine is, however, supposed to be a single phase machine having main terminals X Y, X' Y', &c., for each set of coils, and intermediate terminals Z, Z', &c., to about the middle portion of each coil. Such a machine can be connected to feed a number of separate alternating circuits, and provide an intermediate or out of phase main for each circuit, in accordance with what is known as the monocyclic system. By properly connecting up these sets of coils C, D, they can be made to feed a single circuit in multiple. They may also be connected in series with a single circuit, by connecting the end of each set to the beginning of the next and leading out terminals from the first and last ends of the end sets, and making an intermediate connection from an intermediate set to a supplementary out of phase main. By omitting the intermediate connections altogether, the machine becomes a single phase machine pure and simple, and while my invention is of special importance in connection with polyphase machines, yet as I am the first, so far as known to me, to make a single phase lap winding, which is divided up into entirely separable sets, each set over-lapping only within itself, and not over-lapping with any other set, I consider my invention as extending to single phase machines.

In Fig. 3, H represents the axle, G the axle gear, and 1 the pinion of a three phase induction motor having a closed circuited armature K and a field L. This field structure consists of laminations or punchings l clamped and held in an outer frame M. These punchings may be made as indicated in Fig. 4, consisting of a long and short portion, together forming a half circle. The punchings have dove-tail recesses on their outside, which fit in with dove-tail projections on the field frame, and the long and short punchings are placed alternately so as to break joint. The punchings on the inner side are provided with slots to receive the winding which is divided up into sections C, D. Thus in the three phase twelve pole motor shown there would be three sections above the center line of the motor and three below it; and as the sections immediately above the middle line of the motor do not over-lap the sections immediately below the middle, it becomes possible to divide the motor in two along this line, as is usual with direct current railway motors. The field frame is therefore divided along the line T, the two parts being hinged together at $p$ and held together by removable fastenings in the usual manner. The field punchings are also so arranged that a split or division occurs along this line.

I have shown the motor as having a short circuited revolving member and a stationary inducing field, but it is obvious that the relation might be reversed and a three-phase current be led to the revolving member, in which case the field would be close circuited on itself, but would have a similar arrangement to that above shown.

My invention is also applicable to direct current machines as shown in Fig. 5, wherein, 1, 2, 3, 4, represent field poles of a four pole direct current machine. A represents the armature, carrying coils or bars, having electromotive force producing portions $a$ and cross or end connections $a'$. As usual, there are a larger number of bars or coils than there are pairs of poles, and the bars or wires under one pole are connected across to bars or wires under a pole of opposite sign—the successive bars or wires being connected in consecutive order. Now by the usual method of winding this cross connection is continuous around the machine, proceeding from one pole to another, until the circuit of the armature is made. I have found, however, that in a direct current machine, of two or more pairs of poles, the coils may be divided into sections or sets, one for each pair of poles, and the cross connections of each set may be independent of and free from over-lapping with, the cross connections of the other sets. Thus in this four pole machine, there are two sections of coils C and D, which do not over-lap one another, but are connected by connection at $i$, which may be made easily separable and by cross connections on the commutator. Each of these sections corresponds to a single pair of poles, and it will be seen that in a multiphase machine, I can get as many sections, independent of one another, as far as over-lapping cross connections on the armature is concerned, as there are pairs of poles; and I may therefore correspondingly divide the magnetic structure of the armature into two or more sections, in the same way as above indicated for alternating machines. With four poles, however, as shown in Fig. 5, it is seen that the commutator is not separable, and to get the condition of complete separability of commutator, as well as armature winding, it is necessary to have a multiple of four poles—for example eight—as shown in Fig. 6. Here the parts are lettered as in Fig. 5, but are duplicated on the two sides of the machine. The sections C and D on one side and the sections C' and D' on the other side, with their corresponding parts of the commutator, constitute two complete and separable portions of the machine, so that the latter could be split along the line F, through the magnetic core, commutator and all, without disturbing any connections.

It will be seen therefore that my invention, broadly, covers the division of the winding into sections or units, each unit being, so to speak, complete in itself and independent of other units. This independence may be only partial, and imply only that the coils do not over-lap, or it may be entire independence, the coils being mechanically free from one another, and if desired, electrically separate.

While I have described my invention in connection with dynamo electric machines, it is obviously applicable to any electro-magnetic structure, embodying the same general arrangement of parts and having portions of the winding over-lapping.

What I claim as new, and desire to secure by Letters Patent, is—

1. In a dynamo electric machine, a winding consisting of two or more sets of coils, each set over-lapping within itself, but not over-lapping with other sets.

2. In a dynamo electric machine, a winding consisting of a number of sets of coils, corresponding to the number of pairs of poles, each set over-lapping within itself, but not over-lapping with other sets.

3. In a dynamo electric machine, a winding consisting of two or more sets of coils, corresponding to the number of pairs of poles—each coil having a breadth substantially equal to the polar distance, and the coils in a set over-lapping each other, but not over-lapping coils of other sets.

4. In a polyphase dynamo electric machine, the combination of a circular magnetic structure, coils arranged around said structure and associated in sets, the coils of each set over-lapping one another, but not over-lapping coils of other sets.

5. In a polyphase dynamo electric machine, the combination with the armature and field core, of coils arranged in sets on said core—each coil having a breadth substantially equal to the distance between the poles developed in said core, and the coils of each set over-lapping each other, but not over-lapping coils of other sets.

6. In a dynamo electric machine, the combination with a magnetic core—separable into two or more parts, of a winding on said core, consisting of coils over-lapping one another—the coils on one of said separable parts not over-lapping with coils on the other part or parts.

7. In a dynamo electric machine, the combination with a magnetic core, separable into two or more parts, of a winding on said core, having its coils over-lapping one another, on each separable part, but not over-lapping coils on the other part or parts.

8. A polyphase dynamo electro machine or motor, having its armature or field core divided into two or more separable parts, with coils on each part over-lapping one another, but not over-lapping coils on other parts.

9. A polyphase motor, having an inner revolving member, and an outer stationary member, the outer member having its core divided into two parts, and having coils on each part over-lapping one another, but not over-lapping coils on the other part.

In witness whereof I have hereunto set my hand this 10th day of July, 1894.

CHARLES P. STEINMETZ.

Witnesses:
A. F. MACDONALD,
B. B. HULL.